United States Patent
Jain et al.

(10) Patent No.: US 8,108,325 B2
(45) Date of Patent: Jan. 31, 2012

(54) METHOD AND SYSTEM FOR CLASSIFYING DATA IN SYSTEM WITH LIMITED MEMORY

(75) Inventors: Ankur Jain, Woburn, MA (US); Daniel N. Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 606 days.

(21) Appl. No.: 12/210,289

(22) Filed: Sep. 15, 2008

(65) Prior Publication Data

US 2010/0094783 A1    Apr. 15, 2010

(51) Int. Cl.
*G06F 15/18* (2006.01)
(52) U.S. Cl. ........................................................ 706/12
(58) Field of Classification Search .................... 706/12, 706/45; 382/155, 159, 224, 225
See application file for complete search history.

(56) References Cited

U.S. PATENT DOCUMENTS

| | | | | |
|---|---|---|---|---|
| 6,167,156 | A * | 12/2000 | Antoniades et al. | 382/232 |
| 6,278,799 | B1 * | 8/2001 | Hoffman | 706/15 |
| 7,788,195 | B1 * | 8/2010 | Subramanian et al. | 706/20 |
| 2007/0136256 | A1 * | 6/2007 | Kapur et al. | 707/3 |

OTHER PUBLICATIONS

Xi,X. et al. "Fast time series classification using numerosity reduction". In ICML '06: Proceedings of the 23rd International Conference on Machine Learning. 2006. pp. 1033-1040.*

Ankur Jain et al.: "Incremental Exemplar Learning Schemes for Classification on Embedded Devices" Machine Learning, Kluwer Academic Publishers—Plenum Publishers, NE, vol. 72, No. 3, Jul. 10, 2008, pp. 189-203.

* cited by examiner

*Primary Examiner* — Jeffrey A Gaffin
*Assistant Examiner* — Benjamin Buss
(74) *Attorney, Agent, or Firm* — Dirk Brinkman; Gene Vinokur

(57) ABSTRACT

Embodiments of the invention describe a method for classifying data in a system with limited memory. The method applies exemplar learning (EL) procedures to a training data set to produce an exemplar data set adapted to the size of the memory. The EL procedure is selected form a group consisting of an entropy based exemplar learning (EBEL) procedure and an AUC-based exemplar learning (ABEL) procedure. The exemplar data set is used to classify acquired by the system data.

10 Claims, 4 Drawing Sheets

200

EBEL

Inputs: Existing Training dataset: $\mathcal{T}_{old}$; New Training dataset: $\mathcal{T}_{new}$; Desired size of training subset: $k$; Number of classes: $C$; Kernel function: $\kappa$; bandwidth optimized for $\mathcal{T}_{old}$: $\hat{\lambda}$; Bandwidth update sensitivity parameter: $\alpha$

Outputs: Desired Training subset: $\mathcal{S}$ s.t. $|\mathcal{S}| = k$

1: $\mathcal{S} \leftarrow \mathcal{T}_{old} \cup \mathcal{T}_{new}; N \leftarrow |\mathcal{T}_{old}| + |\mathcal{T}_{new}|, \lambda \leftarrow \hat{\lambda} \left(\frac{|\mathcal{T}_{old}|}{N}\right)^{0.2}$ 2: Initialize $\nu$-matrix s.t., $\nu[c, q] \leftarrow \displaystyle\sum_{(x \in \mathcal{S}) \wedge (class(x) = c) \wedge (x \neq x_q)} \kappa\left(\frac{x_q - x}{\lambda}\right)$ 3: while $|\mathcal{S}| > k$ do

4: $\quad \mathcal{I} \leftarrow \displaystyle\operatorname*{argmin}_{x_i \in \mathcal{S}} -1 * \sum_{c=1}^{C} \frac{\nu[c, i]}{\sum_{c=1}^{C} \nu[c, i]} \log\left(\frac{\nu[c, i]}{\sum_{c=1}^{C} \nu[c, i]}\right)$ {$x_{\mathcal{I}}$'s removal offers least entropy drop}

5: $\quad$ for $i \leftarrow (j | x_j \in \mathcal{S})$ do

6: $\quad\quad \nu[class(x_{\mathcal{I}}), i] \leftarrow \nu[class(x_{\mathcal{I}}), i] - \kappa\left(\frac{x_i - x_{\mathcal{I}}}{\lambda}\right)$ {Update $\nu$-matrix}

7: $\quad$ end for

8: $\quad \mathcal{S} \leftarrow \mathcal{S} \setminus \{x_{\mathcal{I}}\}$ {Remove $x_{\mathcal{I}}$ from $\mathcal{S}$}

9: $\quad$ if $\frac{N}{|\mathcal{S}|} > \frac{\sqrt{N}}{\alpha}$ then

10: $\quad\quad \lambda \leftarrow \hat{\lambda}\left(\frac{N}{|\mathcal{S}|}\right)^{0.2}, N \leftarrow |\mathcal{S}|$ {Update bandwidth}

11: $\quad\quad$ goto Step 2 {Recompute $\nu$-matrix}

12: $\quad$ end if

13: end while

Fig. 3

ABEL

Inputs: Existing Training dataset: $\mathcal{T}_{old}$; New Training dataset: $\mathcal{T}_{new}$; Desired size of training subset: $k$; Classifier to use: $\mathcal{G}$; Validation-set's fractional size: $\eta$

Outputs: Desired Training subset: $\mathcal{S}$ s.t. $|\mathcal{S}| = k$

1: $\mathcal{S} \leftarrow \mathcal{T}_{old} \cup \mathcal{T}_{new}$
2: Initialize $\mathcal{V}$ s.t. $(\mathcal{V} \subseteq \mathcal{S}) \wedge (|\mathcal{V}| = \eta * |\mathcal{S}|)$ {Extract the validation set}
3: $\mathcal{S} \leftarrow \mathcal{S} \setminus \mathcal{V}$ {Ensure $\mathcal{S} \cap \mathcal{V} = \emptyset$}
4: while $|\mathcal{S}| > k$ do
5: $\quad \mathcal{S} \leftarrow \mathcal{S} \setminus \mathrm{argmax}_{x_i \in \mathcal{S}} \mathcal{A}_{\mathcal{G}}(\mathcal{V}, \mathcal{S} \setminus \{x_i\})$ {Remove instance of least AUC loss}
6: end while

Fig. 4

METHOD AND SYSTEM FOR CLASSIFYING DATA IN SYSTEM WITH LIMITED MEMORY

FIELD OF THE INVENTION

This invention relates generally to classification of data, and more particularly to classification of data in systems with limited memory.

BACKGROUND OF THE INVENTION

Data Classification

Data classification assigns a pre-defined label to a data item based on some quantitative information extracted from the item and a training set of previously labeled items. For example, an email classification system can label a specific email as "spam" or "no-spam" based on the email's content and a training dataset of mails that are known to be "spam" or "no-spam." A performance of the classifier depends greatly on the characteristics of the data to be classified. There is no single classifier that works best on all classification problems. The performance also depends on the quality of the training data. A well trained classifier requires large training datasets that have labeled samples with varying characteristics.

Classifiers can vary based on the mathematical models used to extract information from data items, the amount of training data and model complexity. The choice of a classifier often depends on the data characteristics and its computational resource requirement, e.g., such as the CPU usage and memory requirements. For example, some classifiers might be unsuitable when categorization results are required in real-time.

Embedded System

An embedded system is usually integrated into some other device or machine. The embedded system can be designed to perform dedicated functions, often in real-time. Embedded systems are common for many devices, such as portable video players, cameras, traffic lights, factory controllers and surveillance systems. Because many embedded system perform dedicated functions, the embedded system can be optimized for size, cost, reliability and performance.

Embedded systems that include sensors and perform classification can be trained using training data. The trained embedded system can than have an improved functionality and performance. For example, a classifier on a camera can alarm presence of intruder in a "no-trespassing" surveillance area, However, embedded systems typically have limited memory and cannot store a large training data set.

One solution to the limited memory problem is to store only a small number of carefully selected "exemplars" from the training data that are sufficient for effective classification. As defined herein, an exemplar is sample data that are characteristic of a larger training data set.

Exemplar Learning (EL) Methods

An exemplar learning (EL) method can be used to select a small set of training data from a large training dataset. EL, as the name implies, learns by exemplars. That is, 'good' samples that reduce the error rate of the classifier are retained, while 'bad' samples are discarded. Thus, EL can be used to generate a small training data set for a memory-based classifier in an embedded system that has limited memory.

Conventional EL methods learn exemplars based on some neighborhood structure. Then, the methods measure a loss or gain in performance due to a sample being removed, using conventional misclassification rates.

The EL method can continuously adjust the training data set as samples are processed, that is good new samples are retained, and bad new samples are discarded. Thus, the classifier can dynamically adapt to a changing environment in which the embedded system operates. Almost all EL methods discard samples based on the following hypothesis:

Hypothesis 0 ($H_0$): If the removal of a sample in a given training data set does not increase misclassifications or an error-rate of the remaining samples, then the sample can be discarded.

EL methods have some disadvantages.

Incremental Update

Conventional EL methods are computationally intensive, offline, and are not incremental in nature. They require that the entire training data set is stored in a memory throughout the execution of the exemplar EL method. This makes those methods inapplicable for embedded systems where memory is limited, and the training data are updated regularly.

Class-Imbalance

Misclassification rates used in the hypothesis $H_0$ are insensitive to class-imbalance. This problem is critical in EL, where removal of a sample changes the class population. For example, in a set with 90 positive class samples and 10 negative class samples, removing a positive class sample gives nine positive sample misclassifications and one negative sample misclassification, while discarding a negative sample gives one positive and nine negative sample misclassifications.

Because the error rate is the same for both the cases, i.e., 10%, the class-imbalance could cause the discarding of the negative samples, leaving only positive class samples in the training data set.

It is desired to have an EL method that yields an estimate of the classifier's ability to discriminate between two classes, as opposed to the overall classification accuracy to produce better results.

Ordered Removal

Most ordered removal procedures are either ad-hoc, or return a training data set whose size is determined during run-time. Those methods ignore an ordered removal of samples in order to find the best training data set for a given memory size. It is desired to have an EL method that produces an optimal training data set that satisfy predetermined memory size constraints, such as typically found in embedded systems.

Validation Consistency

The conventional EL methods remove samples if the classification error rate for the samples remaining in the training data set does not increase. Accordingly, a sample plays a dual role. That is, the sample participates both in updating the training data set and a testing set to be classified. As the removal progresses, the size and nature of the training data set dynamically varies, and thus the error-rates are determined over different sets that are not consistent and have lower statistical significance. It is desired to have a separate validation data set disjoint from the training data set, which remains unchanged during the removal process.

SUMMARY OF THE INVENTION

The embodiments of the invention provide a method and a system for classifying data samples. More particularly, the samples are sensed by a sensor in an embedded system with limited memory. Therefore, the method constructs an exemplar data set of a predetermined size consistent with the size of the memory.

In one embodiment, the method uses a training data set, which remains unchanged during the training, and a validation data set disjoint from the training data set.

One embodiment of the invention uses entropy based exemplar learning (EBEL) procedure. The EBEL procedure removes instances of samples from the training data set based on information content of the training data set, instead of using an error rate.

Instead of using an ad-hoc ranking scheme, the EBEL procedure removes a training data instance whose removal minimizes a decrease in a conditional entropy of a class indicator variable. This minimizes loss of information. The EBEL method has a low computational overhead, offers ordered removal, and is not sensitive to class-imbalance.

Another embodiment of the invention uses an Area Under a receiver operator characteristic Curve (AUC) using an AUC-based exemplar learning (ABEL) procedure, which removes samples based on a performance of the AUC. The ABEL procedure uses the validation data set, and removes a sample if removal of the sample does not decrease the AUC determined over the validation data set.

BRIEF DESCRIPTION OF THE DRAWINGS

FIG. 3 is pseudo code of an EBEL procedure according to an embodiment of the invention; and FIG. 4 is pseudo code of an ABEL procedure according to an embodiment of the invention.

DETAILED DESCRIPTION OF THE PREFERRED EMBODIMENT

Figure 1:
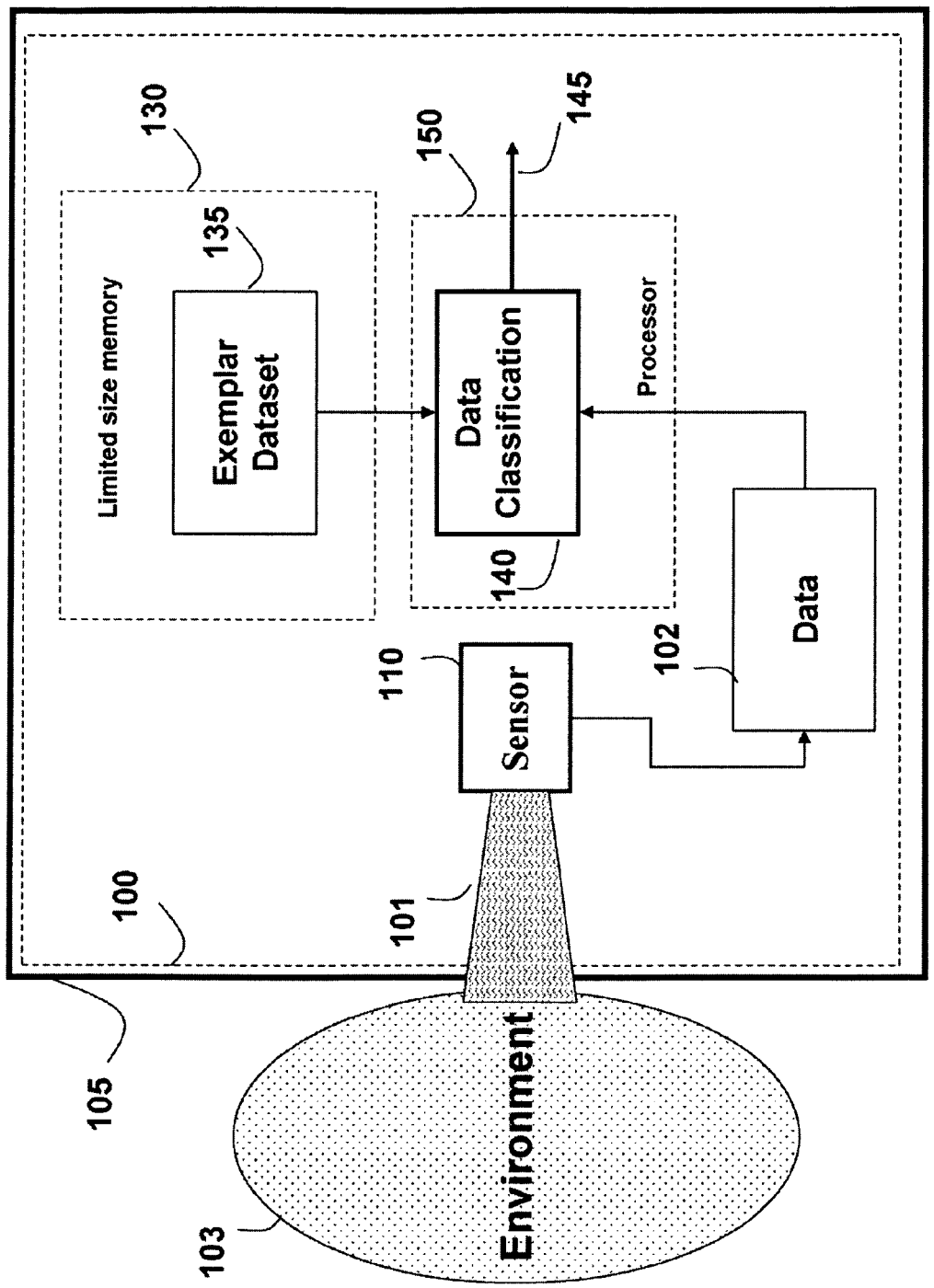
FIG. 1 is a block diagram of a method and a system for classifying data according to embodiments of the invention.

FIG. 1 shows a method and a system 100 for classifying an input signal 101 using exemplar learning (EL) according to embodiments of our invention. The system could be embedded in some other machine or device 105 or work undependably. The system 100 has a limited size memory 130. The input signal 101 is acquired by a sensor 110 and classified 140 in real-time.

The sensor 110 acquires the signal 101 from an environment 103. We use the term "environment" generally to mean anything that can be sensed, e.g., temperature, pressure, humidity, gas, liquid, solid, machines, acoustic and EM waveforms, camera images and the like. Typically, the environment relates to the operation of the device 105 in which the system 100 is embedded. The sensor generates data 102.

The data 102 are classified 140 to produce a data classification output 145. The data classification 140 can be performed by a processor 150. The data classification 140 uses an exemplar data set 135 to classify the data 102. The exemplar data set 135 is stored in a memory 130 that has a limited size, i.e., the memory has a predetermined small size. Thus, a size of the exemplar data set 135 is adapted to fit the memory 130 according to the size of the memory.

Determining the Exemplar Data Set

Figure 2:
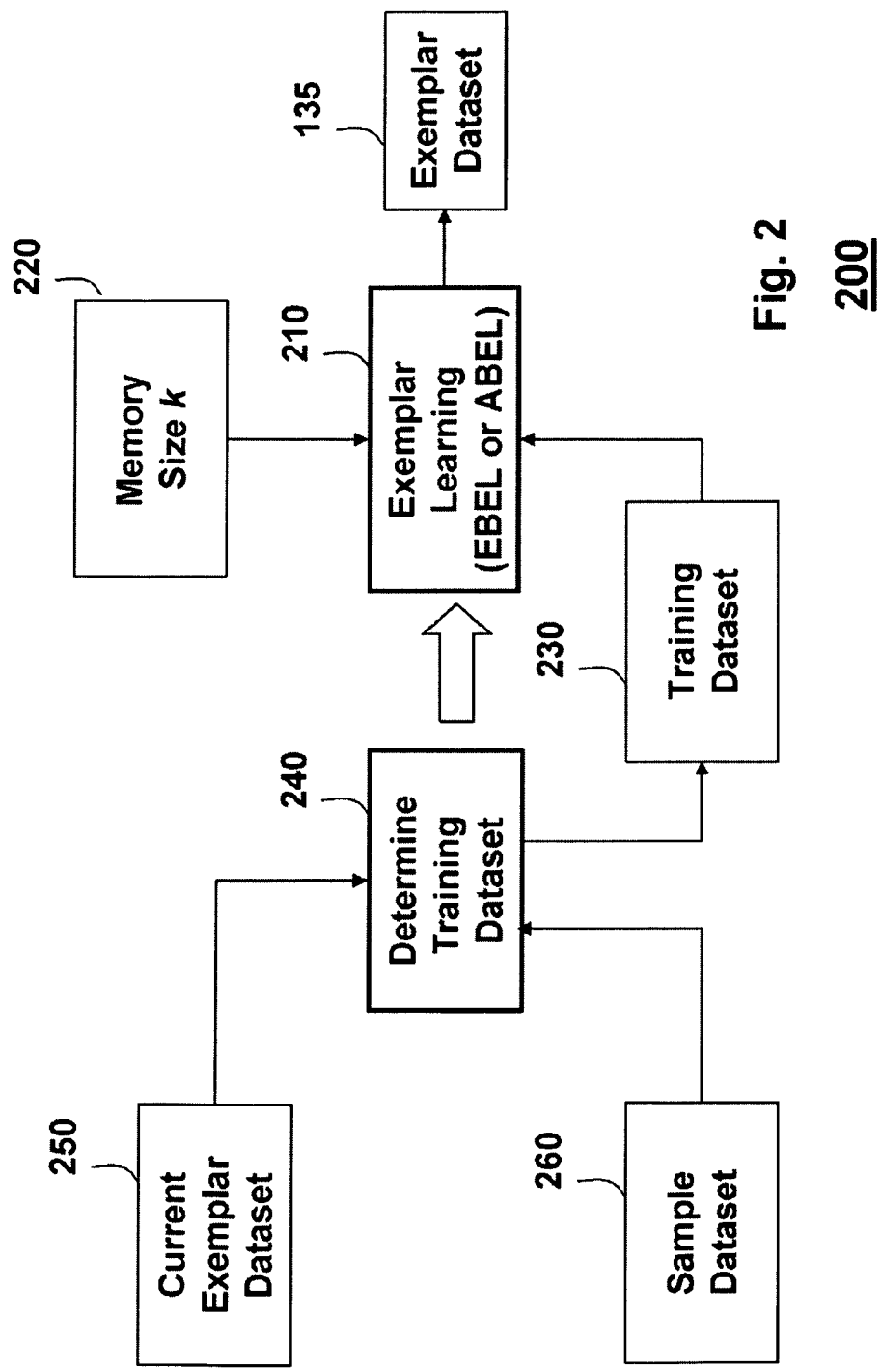
FIG. 2 is a block diagram of a method and a system for determining an exemplar data set according to embodiment of the inventions.

FIG. 2 shows a block diagram of a method and a system 200 for determining the exemplar data set 135 according to an embodiment of the invention. The exemplar data set 135 is further utilized in the method and system 100 for data classification 140.

The embodiments of our invention can use an entropy-based EL (EBEL) procedure or an AUC-based EL (ABEL) procedure for learning 210 the exemplar data set 135. The EL procedure 210 learns the exemplar data set 135 from a training data set 230 according to a limited memory size k 220 of the system 100.

The training data set 230 is determined 240 from a sample data set 260 and from a current exemplar data set 250. In one embodiment of the invention, the determining 240 combines the sample data set 260 and the current exemplar data set 250, as described herein.

The sample data set 260 includes data samples for determining the training data set 230. The sample data set 260 can be generated by some applications or can be constructed from the data 102 generated by the sensor 110. The sample data set 260 can include one or more data samples.

The system and method 200 initiate and update the exemplar data set 135. During the initiation, the current exemplar data set 250 is empty, and the training data set 230 is determined 240 only from the sample data set 260. During the updating, the current exemplar data set 250 is the exemplar data set 135 determined previously.

In contrast with conventional EL procedures, the training data set 230 does not have to be determined using a training data set previously obtained.

Parzen Kernel Density Estimate Based (PKDE) Classifier

Our classifier 140 uses a Parzen kernel density estimate (PKDE) classifier. The PKDE classifier estimates a probability density function (pdf) of a random variable non-parametrically. However, our invention can also be generalized for any classifier.

For a given class c and a training set $S_n$ of n samples, a subset $Z_n^c$ is $$Z_n^c = \{z | (z \in S_n) \wedge (\text{class}(z) = c)\}. \quad (1)$$

For the PKDE classifier, a kernel function $\kappa$ has a bandwidth $\lambda$. For the training subset $S_n$, a density estimate f of a sample x belonging to class c is $$f_c^n(x) = \frac{1}{|Z_n^c|\lambda} \sum_{y \in Z_n^c} \kappa\left(\frac{x-y}{\lambda}\right), \quad (2)$$

where y is sample element in $Z_n^c$

A prior probability $\pi_c^n$ of each class is $$\pi_c^n = \frac{|Z_n^c|}{n}. \quad (3)$$

We can determine a posterior probability p of an arbitrary sample x belonging to a particular class c, given the training data set $S_n$, as $$p(c|x)_{S_n} = \frac{\pi_c^n f_c(x)}{\sum_{j=1}^{C} \pi_j^n f_j(x)}, \quad (4)$$

$$= \frac{\sum_{y \in Z_n^c} \kappa\left(\frac{x-y}{\lambda}\right)}{\sum_{y \in S_n} \kappa\left(\frac{x-y}{\lambda}\right)}.$$

For a binary classification problem, if the two classes are denoted by $C^+$ and $C^-$, then a merit-score $\gamma_n(x)$ of a sample x, given training data set $S_n$, is $$\gamma_n(x) = p(c^+|x)_{S_n} - p_n(c^-|x)_{S_n}. \quad (5)$$

The merit-scores can be used analyzing the accuracy of the classification using area under receiver operating characteristic (AUC) curves, or threshold selection.

Exemplar Learning

We represent the training data set as $\mathcal{T}$, such that, $|\mathcal{T}|=N$, where N is the number of samples in the training data set. A training subset with n samples is $S_n$, such that $S_n \subset \mathcal{T}$, and $S_N = \mathcal{T}$. Given the training subset $S_n$, embodiments of the invention incrementally determine removed subsets $$(S_n | (1 \leq n \leq N) \wedge (S_n \subseteq S_{n+1})),$$

such that a decrease in the classification accuracy in transitioning to $S_n$ from $S_{n+1}$ is less then predetermined threshold.

A simple conventional solution finds all possible combinations of all subsets and selects the subset with the best performance, which has a complexity $O(2^N)$.

Embodiments of our invention use incremental solutions that efficiently obtain $S_{n-1}$ from $S_n$.

Entropy-Based Exemplar Learning (EBEL) Method

For each sample in the training data set 230 $x \in S_n$, EBEL determines the conditional entropy loss of a class variable using the subset $S_n \setminus \{x\}$ as the training data set 230, and x as the testing sample. EBEL selects and removes a selected sample such that a decrease in the conditional entropy is minimized.

If C is the class, p(x) is the prior probability on a training instance x, and H(C|x) the entropy of the class variable conditioned on the presence of instance x, then EBEL selects and removes the selected samples according to:

$$S_{n-1} = S_n \setminus \{\arg\min_{x \in S_n}[H(C|x)]\} \quad (6)$$

where, $$H(C|x) = -p(x)\sum_{c=1}^{C} p(c|x)_{S_n \setminus \{x\}} \log(p(c|x)_{S_n \setminus \{x\}})$$

Because the training data set is independent and identically distributed (I.I.D.), the prior probability p(x) for any sample instance is constant and can be ignored. The classification error of a classifier $\mathcal{G}$ is lower bounded by the conditional entropy as $$P(\mathcal{G}(x) \neq C) \geq \frac{H(C|x) - \log(2)}{\log(C-1)}. \quad (7)$$

Thus, selecting the subset with the least conditional entropy is least likely to reduce the classification accuracy.

Embodiments of the invention determine the most suitable candidate sample for removal in an efficient manner. By storing only the sum of the pair-wise kernel values of the training data set, the sample to be removed can be found in O(N) time.

Given the training subset $S_n$, we store a sum of the kernel values of each sample $x_j \in S_n$ with all other samples in the class as follows:

$$v^n[c, j] = \sum_{x \in Z_n^c \wedge x \neq x_j} \kappa\left(\frac{x - x_j}{\lambda}\right) \quad (8)$$

The conditional entropy of the class output variable with each instance $x_j \in S_n$ can then be obtained as:

$$H(C|x_j) = -\sum_{c=1}^{C} v^n[c, j]\log(v^n[c, j]). \quad (9)$$

If instance y is selected for removal using Equation (6), then the v-matrix can be updated as $$v^{n-1}[\text{class}(y), j] = v^n[\text{class}(y), j] - \kappa\left(\frac{x_j - y}{\lambda}\right). \quad (10)$$

For the training data set 230 $\mathcal{T}$, the kernel bandwidth is obtained, e.g., using A conventional bandwidth optimization scheme that minimizes A mean square error (MSE). If the density for a sample $\hat{f}(x)$ is continuous in the $r^{th}$ order, and does not change with the sample size, then the optimal bandwidth $\lambda(n)$, which minimizes the MSE is related to the sample size n as $$\lambda(n) = \frac{\hat{f}(x)\int_{-\infty}^{\infty} \kappa^2(y)dy}{(2nrk_r f^r(x))^{\frac{1}{2r+1}}}, \quad (11)$$

where $k_r$ is a characteristic component of the kernel function $k(.)$. For r=2, the optimal bandwidth for a sample of size n is $$\lambda(n) = \lambda(N)\left(\frac{N}{n}\right)^{0.2}, \quad (12)$$

where $\lambda(N)$ is the bandwidth obtained using the training data set of size N, which minimizes the MSE. Although this prevents a significant computational effort of repeated bandwidth optimization with changing sample size, a bandwidth update still requires the re-computation of the v-matrix in Equation (10). Because, the bandwidth varies slowly with the sample size as $n^{-0.2}$, we update the v-matrix periodically when $$N_{last}/n > \frac{\sqrt{N_{last}}}{\alpha},$$

where $N_{last}$ is the size of the sample when the last bandwidth update occurred, and $\alpha$ is user-specified sensitivity parameter.

The complexity of the incremental steps in the EBEL procedure are linear in the size of the training data set 230. Thus, the runtime complexity of EBEL procedure for obtaining an exemplar data set 135 of size k from a training data set 230 of size N is $O((N-k)\alpha^2 N)$.

FIG. 3 shows pseudo code of the EBEL procedure according to an embodiment of the invention. When the system is already using the current exemplar data set 250 $\mathcal{T}_{old}$ for classification 140 and is updated with the sample data set 260 $\mathcal{T}_{new}$, the EBEL method in the learning step 210 finds the exemplar data set 135 S s.t., |S|=k. The size k of the desired exemplar set is governed by the memory constrains 220. The bandwidth value $\lambda$ corresponding to $\mathcal{T}_{old}$ is obtained offline. During the initial stage we obtain the exemplar data set 135 of size k from the sample data set $\mathcal{T}$, by setting $\mathcal{T}_{new} = 0$; and $\mathcal{T}_{old} = \mathcal{T}$.

The EBEL procedure first combines data from both the current exemplar data set 250 $\mathcal{T}_{old}$ and the sample data set 260 $\mathcal{T}_{new}$, and updates the corresponding kernel bandwidth accordingly, as shown in Step 1 on FIG. 3.

After computing the ν-matrix, the EBEL procedure reduces the size of the training data set 230 S until the size reaches the desired value k. The instances of the training data set 230 are removed one at a time in steps 4-8, and the ν-matrix is updated if the sample size becomes smaller than that allowed by the sensitivity parameter α, in steps 9-12. The resulting exemplar data set 135 S, replaces the current exemplar data set 250 $\mathcal{T}_{old}$ and is used for classifying 140 the sensed data 102.

AUC-Based Exemplar Learning (ABEL) Method

The ABEL procedure addresses the issue of validation consistency by removing the samples of the training data set based on a dependency between the AUC performance over a consistent validation data set and retained samples. Thus, a sample has the dual role of training sample, as long as the sample is not removed, and a testing sample when determining conditional probabilities of Equation (6).

At different stages of the ABEL procedure, the performance is validated, i.e., the entropy is determined for different data sets, thus reducing the statistical significance of the results.

In the ABEL procedure, the validation data set is extracted from the training data set at the beginning of the removal operation, and the samples of the training data set are removed such that the AUC performance decreases, as a result of the number of removals is minimized. Given the training data set 230 $S_n$, and a validation data set V, such that $\{V \cap S_n\} = \emptyset$, the ABEL procedure removes a sample x according to $$S_{n-1} = S_n \setminus \{\arg\max_{x \in S_n}[A_{\mathcal{G}}(\mathcal{V}, S_n \setminus \{x\})]\}, \quad (13)$$

where $\mathcal{A}_{\mathcal{G}}(X,Y)$ is the AUC value using a set X for testing and a set Y as the training data set. The ABEL procedure provides a simple yet effective EL framework that generalizes to any classifier.

Given the merit scores of the samples in the validation data set, the AUC is determined without actually generating the ROC curve in $O(|\mathcal{V}|^2)$ time. However, for a finite set of samples the AUC is equal to the well known normalized Wilcoxon-Mann-Whitney (WMW) statistic $\mathcal{A}$:

$$A = \frac{\sum_{i=1}^{n}\sum_{j=1}^{p} 1_{(\gamma_i^+ > \gamma_j^-)}}{np}, \quad (14)$$

where $$\Gamma^+ = \{\gamma_1^+, \gamma_2^+, \ldots, \gamma_p^+\}$$

are the merit scores of the positive class and $$\Gamma^- = \{\gamma_1^-, \gamma_2^-, \ldots, \gamma_n^-\}$$

are the merit scores of the negative class samples in $\mathcal{V}$ ($|\mathcal{V}|$=n+p). The statistic uses a non-parametric test for assessing whether two samples come from the same distribution.

Statistic $\mathcal{A}$ is the estimator of $P(\Gamma^+ > \Gamma^-)$, i.e., the probability that all positive class samples obtain a higher merit-score than the negative class samples, and if all the merit scores are sorted in non-decreasing order such that $r_i$ is the rank of $\gamma_i^+$, then $\mathcal{A}$ can be further simplified to $$A = \frac{1}{np}\left(\sum_{i=1}^{p} r_i - \frac{p(p+1)}{2}\right). \quad (15)$$

Equation (15) shows that given the merit scores of the validation data set, the AUC value can be determined in $O(|\mathcal{V}| \log(|\mathcal{V}|))$ time. If $\mathcal{G}^T$ is the time taken by a classifier $\mathcal{G}$ to classify a testing sample using training data set $\mathcal{T}$, then the run-time complexity of ABEL is $O(|V| \cdot (\log(|V|) + \mathcal{G}^T)$.

FIG. 4 shows pseudo code of the ABEL procedure according to an embodiment of the invention. The ABEL procedure first extracts the validation data set from the training data 230, given its fractional size of the validation data set (η) as an input parameter (Step 2) and then removes instances from the remaining samples of the training data set 230 (Step 3-6). The optimal value of the fractional size η depends on the size of the memory, and the complexity of the classification 140. While a large value of the size η results in a high memory overhead, a small value reduces statistical significance of the AUC-scores of the validation data set elements resulting in worse instance removal decisions. One embodiment of the invention uses η=0.1.

EFFECT OF THE INVENTION

Embodiments of our invention describe EBEL and ABEL procedures for determining an exemplar data set, which can be used for data classification in embedded systems with limited memory. The EBEL and ABEL procedures can be updated efficiently with new training data sets while maintaining high quality exemplar data sets of any user-defined size.

It is to be understood that various other adaptations and modifications can be made within the spirit and scope of the invention. Therefore, it is the object of the appended claims to cover all such variations and modifications as come within the true spirit and scope of the invention.

We claim:

1. A method for classifying data in a system with limited memory, comprising the steps of:
    determining a training data set;
    acquiring a size of a memory for storing data;
    applying exemplar learning (EL) procedures to the training data set to produce an exemplar data set adapted to the size of the memory, wherein the EL procedure is selected from a group consisting of an entropy based exemplar learning (EBEL) procedure and an AUC-based exemplar learning (ABEL) procedure;
    acquiring data to be classified; and
    classifying the data using the exemplar data set.

2. The method of claim 1, wherein the determining step further comprising:
    acquiring a current exemplar data set;
    acquiring a sample data set; and
    combining the current exemplar data set with the sample data to produce a training data set.

3. The method of claim 2, wherein the current exemplar data set is initially empty.

4. The method of claim 1, wherein the EBEL procedure further comprises the steps of:

determining, for each sample x in the training data set $S_n$, a conditional entropy loss $H(C|x)$ of a class variable C conditioned on the sample x; and removing from the training data set $S_n$, a selected sample that results into a minimal loss of the conditional entropy $H(C|x)$.

5. The method of claim 4, wherein the selected sample is determined according to $$\arg\min_{x \in S_n}[H(C|x)].$$

6. The method of claim 4, wherein the size of the memory is a size k of the exemplar data set, further comprising:
repeating the determining of the conditional entropy loss step and removing the sample x step, until the training data set reaches the size k.

7. The method of claim 4, wherein the determining of the conditional entropy loss step uses pair-wise kernel values of the samples of the training data set.

8. The method of claim 1, wherein the ABEL method further comprising:

extracting a validation data set $\mathcal{V}$ from the training data set;
determining for each sample x in the training data set $S_n$ an area under a receiver operator curve (AUC) of a subset $S_n \setminus \mathcal{V}$ and
removing from the training data set a sample x that corresponds to a minimal loss the AUC.

9. The method of claim 8, wherein the removing step is according to $$S_{n-1} = S_n \setminus \{\arg\max_{x \in S_n}[A_{\mathcal{G}}(\mathcal{V}, S_n \setminus \{x\})]\},$$

where $\mathcal{V}(\mathcal{A}_{\mathcal{G}} S_n \setminus \{x\})$ is the AUC determined for the validation data set $\mathcal{V}$ and a sample x of the training data set $S_n$, and $S_{n-1}$ is a new training data set after the removing step.

10. The method of claim 8, wherein a size of the validation data set equals to 0.1 of a size of the training data set.

* * * * *